United States Patent
Greenblatt et al.

(10) Patent No.: US 12,536,652 B2
(45) Date of Patent: Jan. 27, 2026

(54) IMAGE SCORING USING ERROR PREDICTION

(71) Applicant: Takeda Pharmaceutical Company Limited, Osaka (JP)

(72) Inventors: Elliot Greenblatt, Cambridge, MA (US); Jenifer Siegelman, Newton, MA (US); Ozlem Yardibi, Wayland, MA (US)

(73) Assignee: Takeda Pharmeceutical Company Limited, Osaka (JP)

( * ) Notice: Subject to any disclaimer, the term of this patent is extended or adjusted under 35 U.S.C. 154(b) by 453 days.

(21) Appl. No.: 18/004,716

(22) PCT Filed: Jul. 15, 2021

(86) PCT No.: PCT/JP2021/026607
§ 371 (c)(1),
(2) Date: Jan. 9, 2023

(87) PCT Pub. No.: WO2022/014672
PCT Pub. Date: Jan. 20, 2022

(65) Prior Publication Data
US 2023/0245302 A1 Aug. 3, 2023

Related U.S. Application Data

(60) Provisional application No. 63/052,293, filed on Jul. 15, 2020.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10068* (2013.01); *G06T 2207/20084* (2013.01)

(58) Field of Classification Search
None
See application file for complete search history.

(56) References Cited

U.S. PATENT DOCUMENTS

2018/0247107 A1   8/2018   Murthy et al.

FOREIGN PATENT DOCUMENTS

| EP | 3361421 A1 * | 8/2018 | ............. G06N 3/045 |
| JP | 202089710 A | 6/2020 | |
| WO | WO-2020079667 A1 * | 4/2020 | ........... G06F 16/383 |

OTHER PUBLICATIONS

International Search Report and Written Opinion dated Nov. 4, 2021 for PCT Application No. PCT/JP2021/026607.

(Continued)

*Primary Examiner* — Thomas D Lee
(74) *Attorney, Agent, or Firm* — HONIGMAN LLP

(57) ABSTRACT

A method for scoring image data using error prediction includes receiving a frame of image data representative of an intensity of a condition. The method also includes processing, using a neural network, the frame of image data. The method also includes predicting, by the neural network, an intensity value of the condition based on the frame of image data. The method also includes predicting, by the neural network, an error value of the predicted intensity value. The error value is representative of a difference between the predicted intensity value and a ground truth intensity value of the frame of image data.

30 Claims, 8 Drawing Sheets

(56) References Cited

OTHER PUBLICATIONS

Stideham et al., "Performance of a Deep Learning Model vs Human Reviewers in Grading Endoscopic Disease Severity of Patients With Ulcerative Colitis", Jama Network Open, vol. 2, No. 5, p. e193963, XP055714463, DOI: 10.1001/jamanetworkopen.2019.3963, May 3, 2019.

* cited by examiner

IMAGE SCORING USING ERROR PREDICTION

CROSS REFERENCE TO RELATED APPLICATIONS

This U.S. patent application claims priority under 35 U.S.C. § 371 from PCT/JP2021/026607, filed on Jul. 15, 2021, which claims priority under 35 U.S.C. § 119(e) to U.S. Provisional Application 63/052,293, filed on Jul. 15, 2020. The disclosures of these prior applications are considered part of the disclosure of this application and are hereby incorporated by reference in their entireties.

TECHNICAL FIELD

This disclosure relates to scoring some or all of an image using error prediction.

BACKGROUND

The advent of machine learning (e.g., neural networks) has enabled machines to evaluate frames of image data in lieu of or alongside manual evaluation. Typically, these algorithms receive an input frame of image data, process the frame, and output a prediction. In some examples, the prediction is a score representative of an aspect or feature of the frame. In other examples, the prediction is a segmentation of an area of interest of the frame of image data. Either way, machine learning allows for the processing of large quantities of image data rapidly. These techniques are applicable to a wide range of technologies. In one example, the algorithms are employed to analyze image data captured during medical procedures (e.g., endoscopies, x-rays, etc.). Specifically, machine learning may be employed to predict an intensity of a condition represented in frames of image data captured during the medical procedure (e.g., of an internal organ such as a digestive organ).

SUMMARY

One aspect of the disclosure provides a method for image scoring using error prediction. The method includes receiving, at data processing hardware, a frame of image data representative of an intensity of a condition. The method also includes processing, by the data processing hardware, using a neural network, the frame of image data and predicting, by the neural network, an intensity value of the condition based on the frame of image data. The method includes predicting, by the neural network, an error value of the predicted intensity value. The error value is representative of a difference between the predicted intensity value and a ground truth intensity value of the frame of image data.

Implementations of the disclosure may include one or more of the following optional features. In some implementations, the method further includes receiving, by the data processing hardware, video data including a series of frames of image data where each frame is representative of the intensity of the condition. The method also further includes determining, by the data processing hardware, the intensity of the condition based on the predicted intensity values and the predicted error values of each frame of the series of frames of image data.

In some examples, determining the intensity of the condition based on the predicted intensity values and the predicted error values of each frame of the series of frames includes fitting a curve to at least a portion of the predicted intensity values. Optionally, the method further includes determining, by the data processing hardware, a frame informativeness for each frame in the series of frames of image data based on the corresponding error value of the frame. The frame informativeness is representative of a difficulty of determining the intensity value of the corresponding frame. The method also further includes selecting, by the data processing hardware, a subset of frames of the series of frames of image data based on the frame informativeness and providing, by the data processing hardware, the selected subset of frames for manual evaluation.

In some implementations, selecting the subset of frames includes selecting the frames with the highest frame informativeness. The neural network may include a regression convolutional neural network (CNN). Predicting the intensity value of the condition based on the frame of image data may include predicting an orientation intensity value of the condition for each of a plurality of different orientations of the frame of image data and determining the intensity value of the condition based on each of the orientation intensity values.

In some examples, determining the intensity value of the condition based on each of the orientation intensity values includes determining an inverse variance weighted mean of the orientation intensity values. Optionally, the plurality of different orientations comprises eight different orientations. In some implementations, the neural network is initially trained using a first loss function. The first loss function is representative of the difference between the predicted intensity value and the ground truth intensity value of the frame of image data. The neural network, after being initially trained using the first loss function, may be subsequently trained with a second loss function representative of the difference between the predicted intensity value and the ground truth intensity value of the frame of image data and a difference between the predicted error value and a ground truth error value of the frame of image data.

In some implementations, the condition includes a disease. The frame of image data may be representative of an inside surface of a digestive organ of a patient. The digestive organ may include an esophagus, a stomach, a small intestine or a large intestine.

Another aspect of the disclosure provides a method for image scoring using error prediction. The method includes receiving, at data processing hardware, a frame of image data representative of an area of interest. The method also includes processing, by the data processing hardware, using a neural network, the frame of image data and segmenting, by the neural network, the area of interest based on the frame of image data. The method also includes predicting, by the neural network, an error value of the segmented area of interest. The error value is representative of a difference between the segmented area of interest and a ground truth area of interest of the frame of image data.

Another aspect of the disclosure provides a system for providing image scoring using error prediction. The system includes data processing hardware and memory hardware in communication with the data processing hardware. The memory hardware stores instructions that when executed on the data processing hardware cause the data processing hardware to perform operations. The operations include receiving a frame of image data representative of an intensity of a condition. The operations also includes processing, using a neural network, the frame of image data and predicting, by the neural network, an intensity value of the condition based on the frame of image data. The operations include predicting, by the neural network, an error value of the predicted intensity value. The error value is representative of a difference between the predicted intensity value and a ground truth intensity value of the frame of image data.

This aspect may include one or more of the following optional features. In some implementations, the operations further include receiving video data including a series of frames of image data where each frame is representative of the intensity of the condition. The operations also further include determining the intensity of the condition based on the predicted intensity values and the predicted error values of each frame of the series of frames of image data.

In some examples, determining the intensity of the condition based on the predicted intensity values and the predicted error values of each frame of the series of frames includes fitting a curve to at least a portion of the predicted intensity values. Optionally, the operations further include determining a frame informativeness for each frame in the series of frames of image data based on the corresponding error value of the frame. The frame informativeness is representative of a difficulty of determining the intensity value of the corresponding frame. The operations also further include selecting a subset of frames of the series of frames of image data based on the frame informativeness and providing the selected subset of frames for manual evaluation.

In some implementations, selecting the subset of frames includes selecting the frames with the highest frame informativeness. The neural network may include a regression convolutional neural network (CNN). Predicting the intensity value of the condition based on the frame of image data may include predicting an orientation intensity value of the condition for each of a plurality of different orientations of the frame of image data and determining the intensity value of the condition based on each of the orientation intensity values.

In some examples, determining the intensity value of the condition based on each of the orientation intensity values includes determining an inverse variance weighted mean of the orientation intensity values. Optionally, the plurality of different orientations comprises eight different orientations. In some implementations, the neural network is initially trained using a first loss function. The first loss function is representative of the difference between the predicted intensity value and the ground truth intensity value of the frame of image data. The neural network, after being initially trained using the first loss function, may be subsequently trained with a second loss function representative of the difference between the predicted intensity value and the ground truth intensity value of the frame of image data and a difference between the predicted error value and a ground truth error value of the frame of image data.

In some implementations, the condition includes a disease. The frame of image data may be representative of an inside surface of a digestive organ of a patient. The digestive organ may include an esophagus, a stomach, a small intestine or a large intestine.

Another aspect of the disclosure provides another system for providing image scoring using error prediction. The system includes data processing hardware and memory hardware in communication with the data processing hardware. The memory hardware stores instructions that when executed on the data processing hardware cause the data processing hardware to perform operations. The operations include receiving a frame of image data representative of an area of interest. The operations also include processing, using a neural network, the frame of image data and segmenting, by the neural network, the area of interest based on the frame of image data. The operations also include predicting, by the neural network, an error value of the segmented area of interest. The error value is representative of a difference between the segmented area of interest and a ground truth area of interest of the frame of image data.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

Like reference symbols in the various drawings indicate like elements.

DETAILED DESCRIPTION

Analyzing frames of image data (e.g., to evaluate an intensity of a condition) is traditionally a time-consuming endeavor. However, advances in machine learning have provided opportunities to drastically reduce the effort required in analyzing image data. Typically, conventional machine learning algorithms are trained to predict a value (or segmentation of an area of interest) based on one or more frames of image data. Properly trained models may approach or even exceed the accuracy of trained human evaluators.

The medical field requires accurate analysis of large quantities of image data. For example, common medical procedures capture image data (e.g., video data) of internal organs or other structures within the body. This image data may be evaluated to determine an intensity of a condition. For example, a trained evaluator may evaluate image data of a digestive organ to determine an intensity of a disease such as celiac disease, Crohn's disease, etc. However, due to the wide range of potential expressed symptoms and the varying quality of the image data, accurate and consistent evaluation of the condition is difficult for trained experts and machine learning algorithms alike. However, accurate evaluation of the image data is critically important for improving patient care.

Implementations herein are directed toward an image scoring system that includes an error prediction model that evaluates a frame of image data and makes a prediction of at least one value based on the frame of image data and a prediction of an error of the predicted value. The predicted error represents a difference between the predicted value and a ground truth value associated with the frame of image data.

That is, the error prediction model predicts its own error of its own prediction. The system may use the predicted values and/or the predicted error to, for example, determine an intensity of a condition and a certainty of the determination and/or curate a set of frames of image data for further evaluation.

Figure 1:
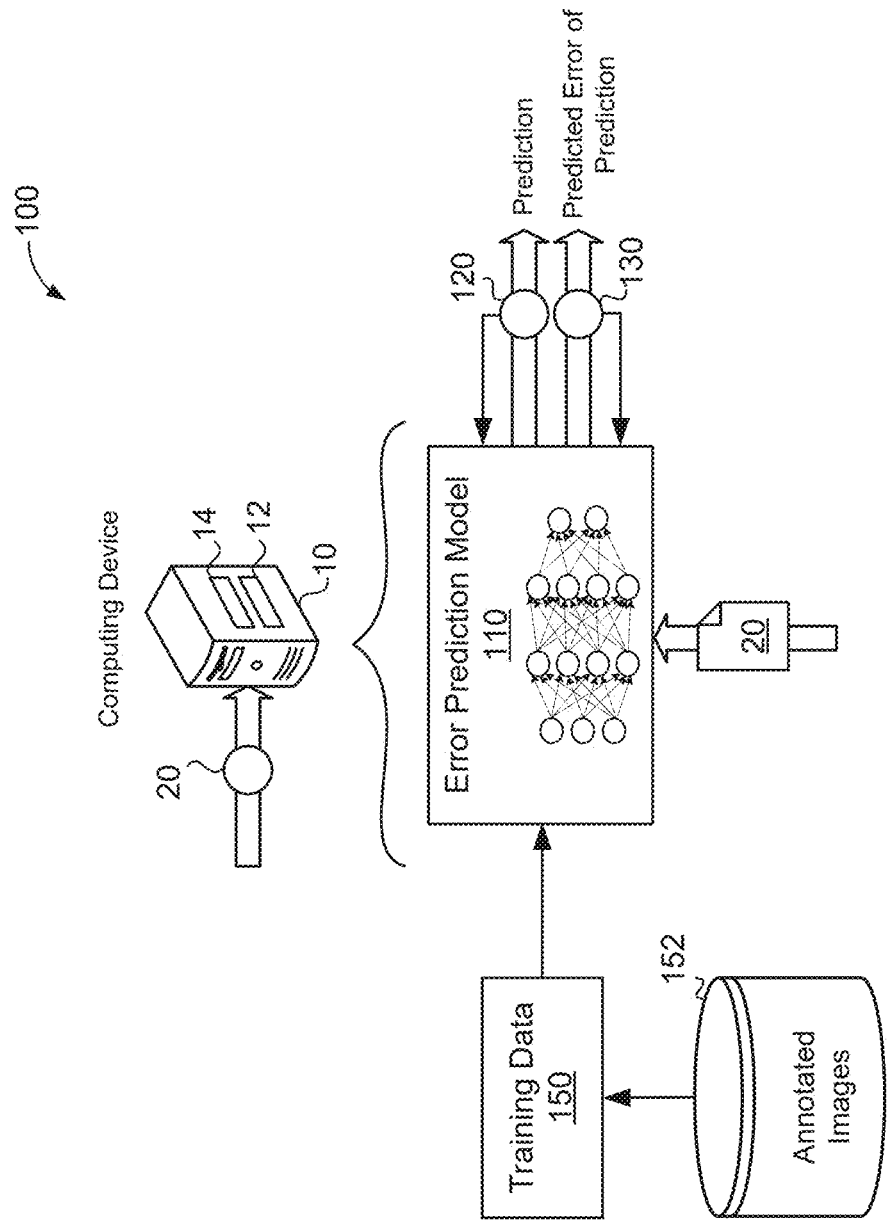
FIG. 1 is a schematic view of an example system for image scoring using error prediction.

Referring to FIG. 1, in some implementations, an example system 100 includes a computing device 10. The computing device 10 may correspond to any device, such as a desktop workstation, a laptop workstation, or a mobile device (i.e., a smart phone). The computing device 10 includes computing resources 12 (e.g., data processing hardware) and/or storage resources 14 (e.g., memory hardware). The computing device 10 may be a single computer, multiple computers, or a distributed system (e.g., a cloud environment) having scalable/elastic computing resources and/or storage resources. The computing device 10 is configured to receive or obtain a frame of image data 20. The frame encompasses any structure for encapsulating any sort or amount of image data. The frame of image data 20, in some examples, is representative of an intensity of a condition. For example, the frame of image data 20 represents an inside surface of a digestive organ (e.g., an esophagus, a stomach, a small intestine or a large intestine, etc.) of a patient and the condition is a disease. In other examples, the frame of image data 20 is representative of an area of interest. The computing device 10 may receive the frame of image data 20 via a peripheral device connected to the computing device 10 (e.g., a camera or storage device) or from another computing device via, for example, a network.

In some implementations, the computing device 10 preprocesses the frame of image data 20. For example, the computing device 10 crops the frame of image data 20 (e.g., to a 512×512 resolution), converts the frame of image data 20 to grayscale (e.g., using a geometric mean of RGB color channels), and/or encodes position information within the frame 20. In other examples, the computing device 10 receives the frame of image data 20 already preprocessed by a remote entity.

The computing device 10 executes an error prediction model 110. The error prediction model 110, in some implementations, is a neural network with one or more layers. For example, the error prediction model 110 is a regression convolutional neural network (CNN), although other types of neural networks may also be used. The error prediction model 110, during inference, receives the frame of image data 20 and, in some examples, predicts an intensity value 120 of a condition represented in the frame of image data 20 and predicts an error value 130 of the predicted intensity value 120. The predicted error value 130 is representative of a difference between the predicted intensity value and a ground truth intensity value 122 (FIG. 5) of the frame of image data 20 (i.e., the ideal result).

The error value 130 may be indicative of a certainty or confidence of the error prediction model 110 in the predicted intensity value 120. For example, a smaller error value 130 (i.e., the error prediction model 110 predicts a small difference between the predicted intensity value 120 and the ground truth intensity value 122) indicates a high confidence in the predicted intensity value 120. On the other hand, a larger error value 130 (i.e., the error prediction model 110 predicts a large difference between the predicted intensity value 120 and the ground truth intensity value 122) may indicate a low confidence in the predicted intensity value 120.

While in the illustrated example the error prediction model 110 receives a frame of image data 20 that is indicative of an intensity of a condition and predicts both the intensity value 120 and an error value 130 associated with the frame of image data 20, this example is not intended to limit the error prediction model 110. That is, the error prediction model 110 may be trained to receive any sort of data and to make any prediction regarding the received data and a predicted error value of the prediction. For example, the error prediction model 110 may receive a frame of image data representative of an area of interest. The error prediction model 110 may segment the area of interest (i.e., determine the position and boundaries of the area of interest) based on the frame of image data. The error prediction model 110 may also predict an error value of the segmented area of interest that is representative of a difference between the segmented area of interest and a ground truth area of interest. Again, the error value is indicative of a confidence or certainty in the predicted value regardless of the specifics of the input data.

With continued reference to FIG. 1, in some implementations, the error prediction model 110 is trained on training data 150 generated from a corpus of training frames of image data 152, each training frame of image data 152 representative of an intensity of a condition. The corpus of training frames of image data 152 may be annotated (i.e., indicate the ground truth intensity value associated with the respective frame of image data). The error prediction model 110, during training, receives the training data 150 and generates the predicted intensity value 120 and the error value 130. The predicted values 120, 130 and the actual ground truth values 122, 132 (from the annotated images 152) are directed back to the error prediction model in the form of one or more loss functions (FIG. 5) to alter one or more weights associated with the error prediction model 110 (e.g., backpropagation).

Figure 2:
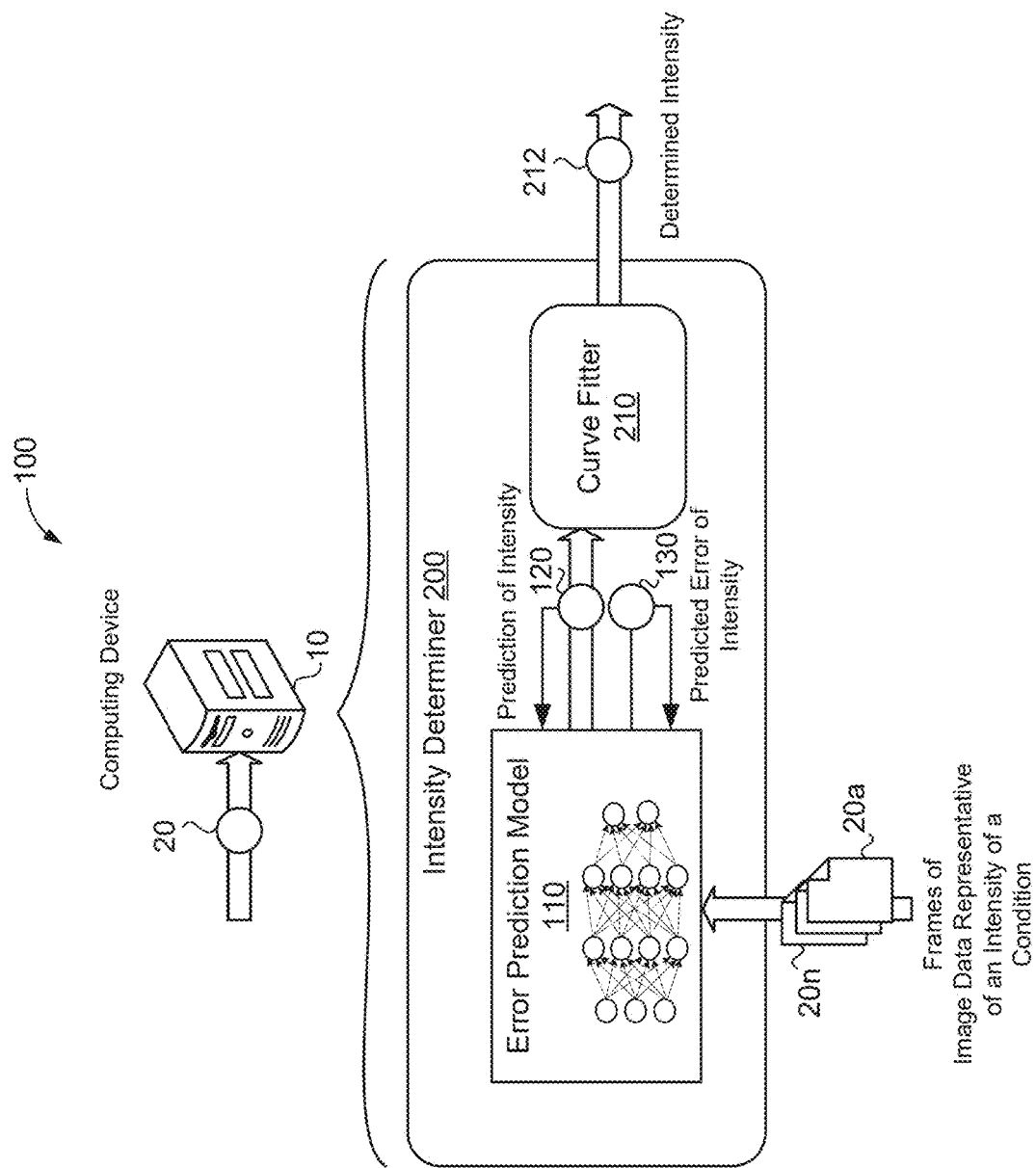
FIG. 2 is a schematic view of an intensity determiner of the example system of FIG. 1.

Referring now to FIG. 2, in some implementations, the computing device 10 executes an intensity determiner 200 that includes the error prediction model 110. The intensity determiner 200 receives video data that includes a series of frames of image data 20a-n where each frame 20 is representative of the intensity of the condition. The intensity determiner 200 provides the frames of image data 20 to the error prediction model 110 one at a time and records or stores the associated predicted intensity values 120 and error values 130 of each frame 20. The intensity determiner 200 determines an overall intensity of the condition 212 based on the predicted intensity values 120 and/or predicted error values 130 of each frame of the series of frames of image data 20. For example, the intensity determiner 200 executes a curve fitter 210 that fits a curve to at least a portion of the predicted intensity values 120. The curve fitter 210 may use weighted averages of frames 20. The weight of each predicted intensity value 120 may be based on the corresponding predicted error value 130. For instance, a lower predicted error value 130, which may be indicative of a higher degree of confidence in the predicted intensity value 120, may be associated with a higher weight for the corresponding predicted intensity value 120. Similarly, a higher predicted error value 130, which may be indicative of a lower degree of confidence in the predicted intensity value 120, may be associated with a lower weight for the corresponding predicted intensity value 120.

Figure 3:
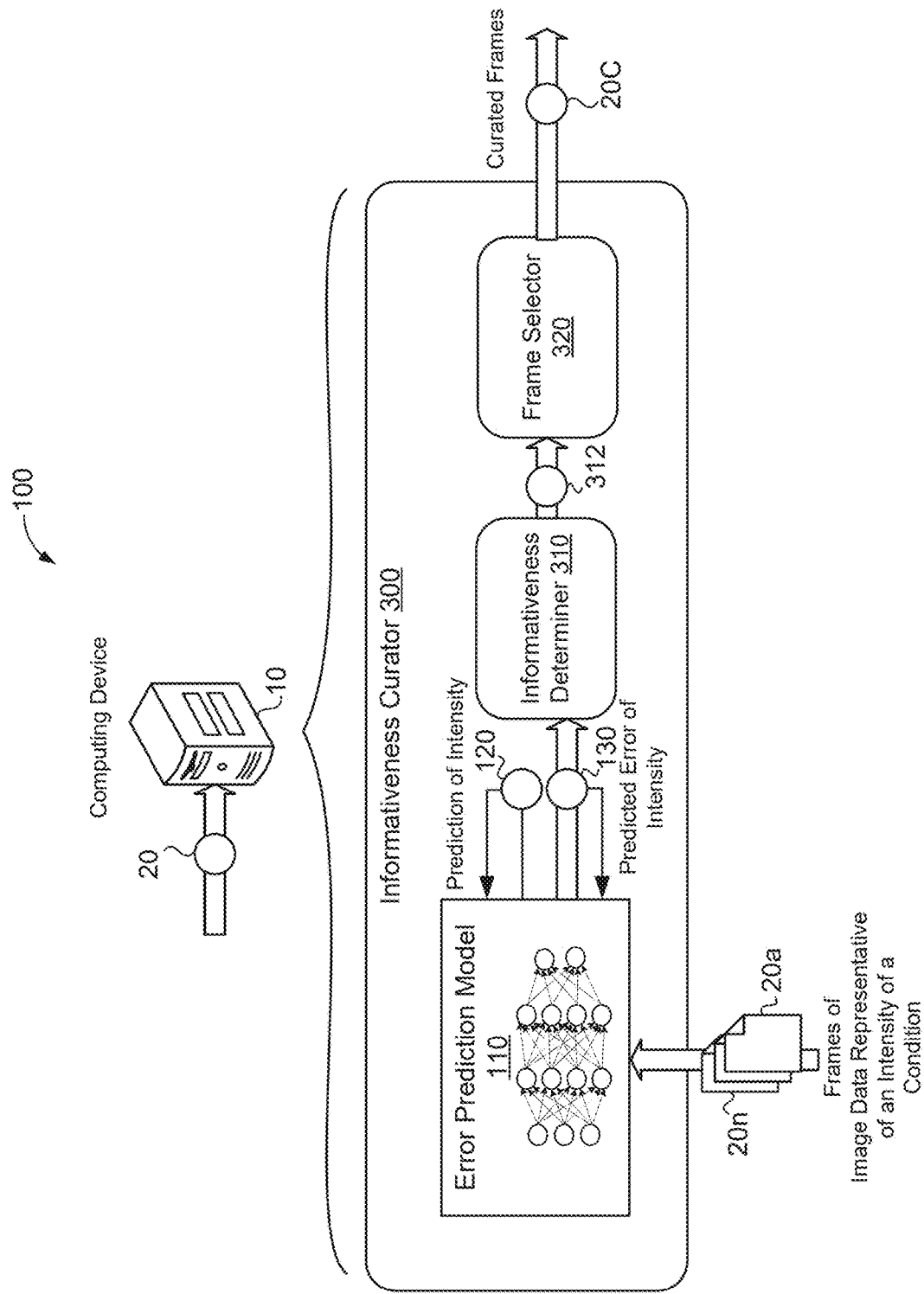
FIG. 3 is a schematic view of an informativeness curator of the example system of FIG. 1.

Referring now to FIG. 3, in some examples, the computing device executes an informativeness curator 300 that includes the error prediction model 110. The informativeness curator 300 includes an informativeness determiner 310 that receives the predicted error value 130 for frame of image data 20 in a series (i.e., video data). The informativeness determiner 310 determines a respective frame informativeness 312 for each frame of image data 20 that represents a difficulty of determining the intensity value of the corresponding frame of image data 20. The difficulty of determining the intensity value is correlated with the error value 130 of the predicted intensity value 120. That is, a higher error value 130 may be indicative of a low confidence in the predicted intensity value 120, which in turn may be indicative of a high degree of difficulty in determining the intensity value from the respective frame of image data 20. For example, some frames of image data 20 may be of poor quality that makes accurate evaluation difficult, and the frame informativeness 312 may quantify this aspect.

The informativeness curator 300 may also execute a frame selector 320. The frame selector 320 selects a subset of frames of image data 20C from the series of frames of image data 20 based on the frame informativeness 312 of each frame 20 received from the informativeness determiner 310. For example, the frame selector 320 may select a number of frames 20C with the highest frame informativeness 312 (e.g., the ten frames with the highest frame informativeness 312). In other examples, the frame selector 320 selects all frames of image data 20C that satisfy a threshold informativeness value. For example, the frame selector 320 selects all frames 20 with a frame informativeness 312 higher than the threshold value.

In some examples, the frame selector 320 provides the selected frames 20C for manual evaluation. Thus, the informativeness curator 300 may curate a set of frames of image data 20C that are the easiest (e.g., have the lowest error values 130) to determine the intensity of the condition. That is, the intensity of the condition is more apparent in the curated set of frames 20C than in the frames of image data 20 not selected by the informativeness curator 300. This allows an expert to quickly evaluate only the most relevant frames of image data 20. In this way, the informativeness curator 300 may greatly reduce the quantity of frames 20 the expert must evaluate to determine the intensity of the condition.

Figure 4:
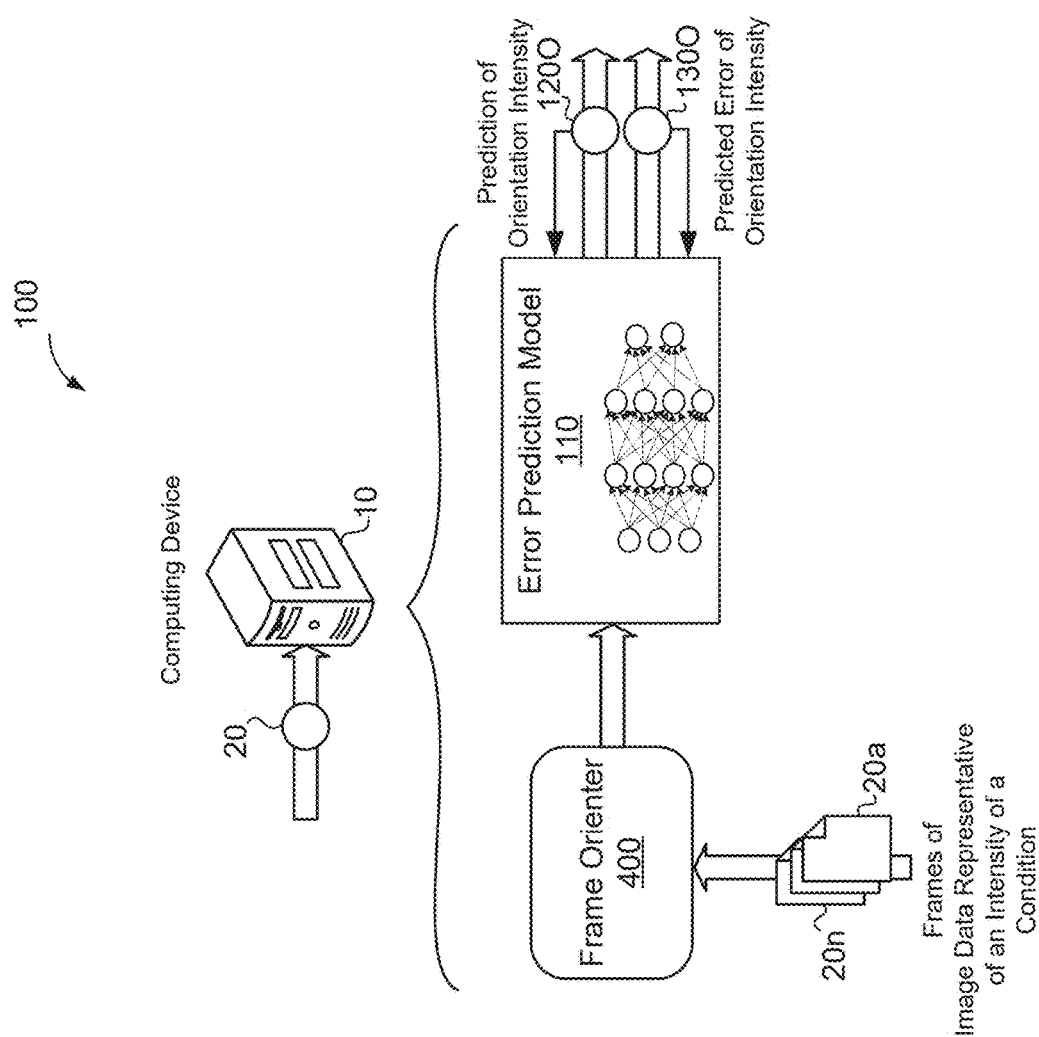
FIG. 4 is a schematic view of a frame orienter of the example system of FIG. 1.

Referring now to FIG. 4, in some examples, the computing device 10 executes a frame orienter 400 that receives the frames of image data 20 prior to the error prediction model 110. The frame orienter 400 provides the error prediction model 110 with each frame of image data 20 in a plurality of different orientations (e.g., rotating by 90 degrees, 180 degrees, 270 degrees, etc.). For example, the frame orienter 400 provides the error prediction model 110 with eight different orientations of each frame of image data 20. The error prediction model 110 predicts an orientation intensity value 120O and a corresponding orientation error value 130O for each of the plurality of different orientations. The computing device 10 may determine the overall intensity value of the frame of image data 20 based on each of the corresponding orientation intensity values 120O (and similarly the orientation error values 130O). For example, the computing device 10 determines an average or an inverse variance weighted mean of the orientation intensity values 120O. The computing device 10 may perform other computations based on the orientation intensity values 120O and orientation error values 130O. For example, the computing device 10 may determine a standard deviation for both the orientation intensity values 120O and the orientation error values 130O. The standard deviation may affect, among other things, the frame informativeness 312 of the frame of image data 20. For example, a lower standard deviation may be associated with a higher frame informativeness 312 while conversely a higher standard deviation may be associated with a lower frame informativeness 312.

Figure 5:
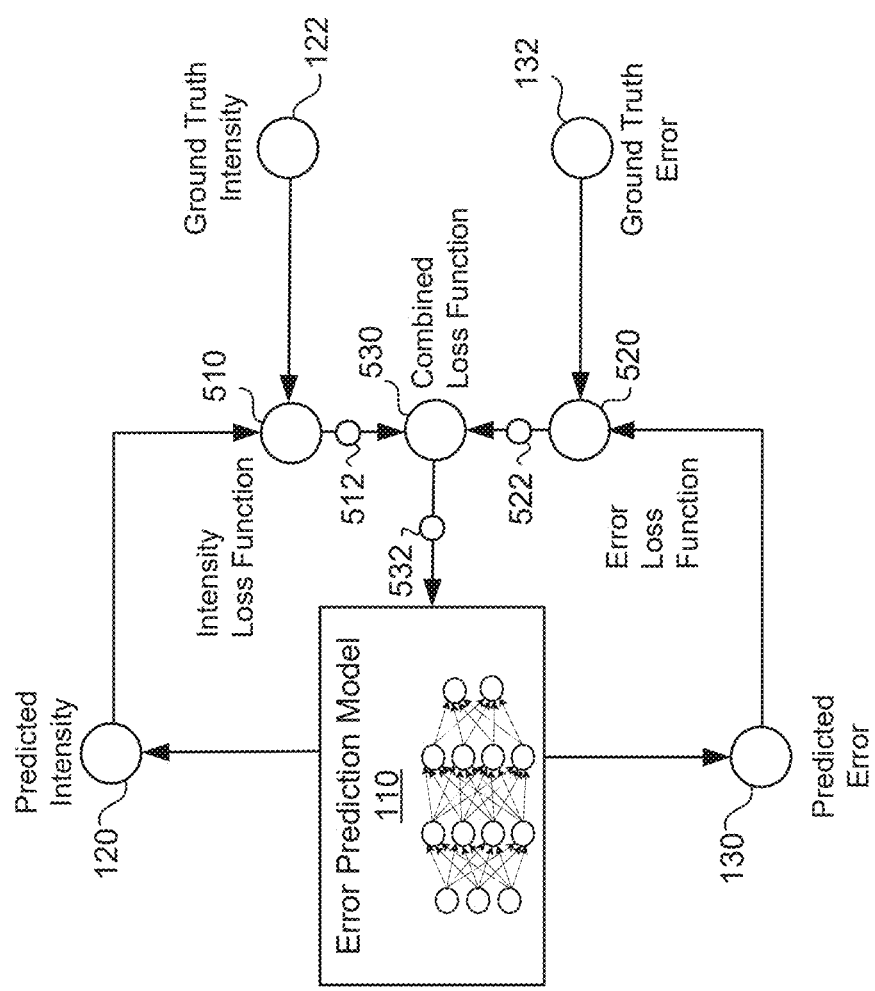
FIG. 5 is a schematic view of loss rate functions of the example system of FIG. 1.

Referring now to FIG. 5, in some examples, the error prediction model 110 (i.e., a neural network) is trained with a combined loss function 530 that is a combination of an intensity loss function 510 and an error loss function 520. The intensity loss function 510 measures a loss or cost of the predicted intensity 120 versus the corresponding ground truth intensity value 122. Generally, the closer the predicted intensity value 120 to the ground truth intensity value 122, the smaller an intensity loss 512 determined by the intensity loss function 510. Similarly, the error loss function 520 determines a loss or cost of the predicted error value 130 versus a ground truth error value 132. The ground truth error value 132 may be determined from the actual difference between the predicted intensity value 120 and the ground truth intensity value 122. The error loss function 520 determines an error loss 522 based on the difference between the predicted error value 130 and the ground truth error value 132.

The combined loss function 530 may receive both the intensity loss 512 and the error loss 522 and determine a combined loss 532. The combined loss 532 may be back-propagated to the error prediction model 110 to tune the model 110. In some examples, the error prediction model 110 is first partially trained using only the intensity loss function 510 and intensity loss 512. That is, the error prediction model 110 may be trained initially by backpropagating of only the intensity loss 512. Subsequent to the initial training, the error prediction model 110 may be trained using the combined loss 532. In this way, the error prediction model 110 is trained using a two-step training process so that the error prediction model 110 is largely trained by the intensity loss 512 and then tuned or adjusted by the combined loss 532 to further increase accuracy. Optionally, the subsequent training may first train only a portion of the error prediction model 110 (e.g., only the topmost dense layers) and then train the entirety of the error prediction model 110. Besides the other benefits of the error value 130, inclusion of the error loss 522 (i.e., with the combined loss function 530) may increase the accuracy of the predicted intensity value 120. That is, training the error prediction model 110 to predict its own error may lead to a direct increase of accuracy in the predicted intensity value 120 measured against the ground truth intensity value 122.

Thus, the image scoring system provides an error prediction model 110 that makes not only a prediction of an intensity value, but also a prediction of an error of the intensity value. The predicted error may be treated as a measure of confidence that allows the system to ignore frames of low confidence and help identify frames that are difficult for both machine and human to evaluate. The techniques described herein are effective for regression outputs and do not require difficult and computationally expensive operations. The error prediction model may be trained end-to-end, simplifying training and integration within the system.

Figure 6:
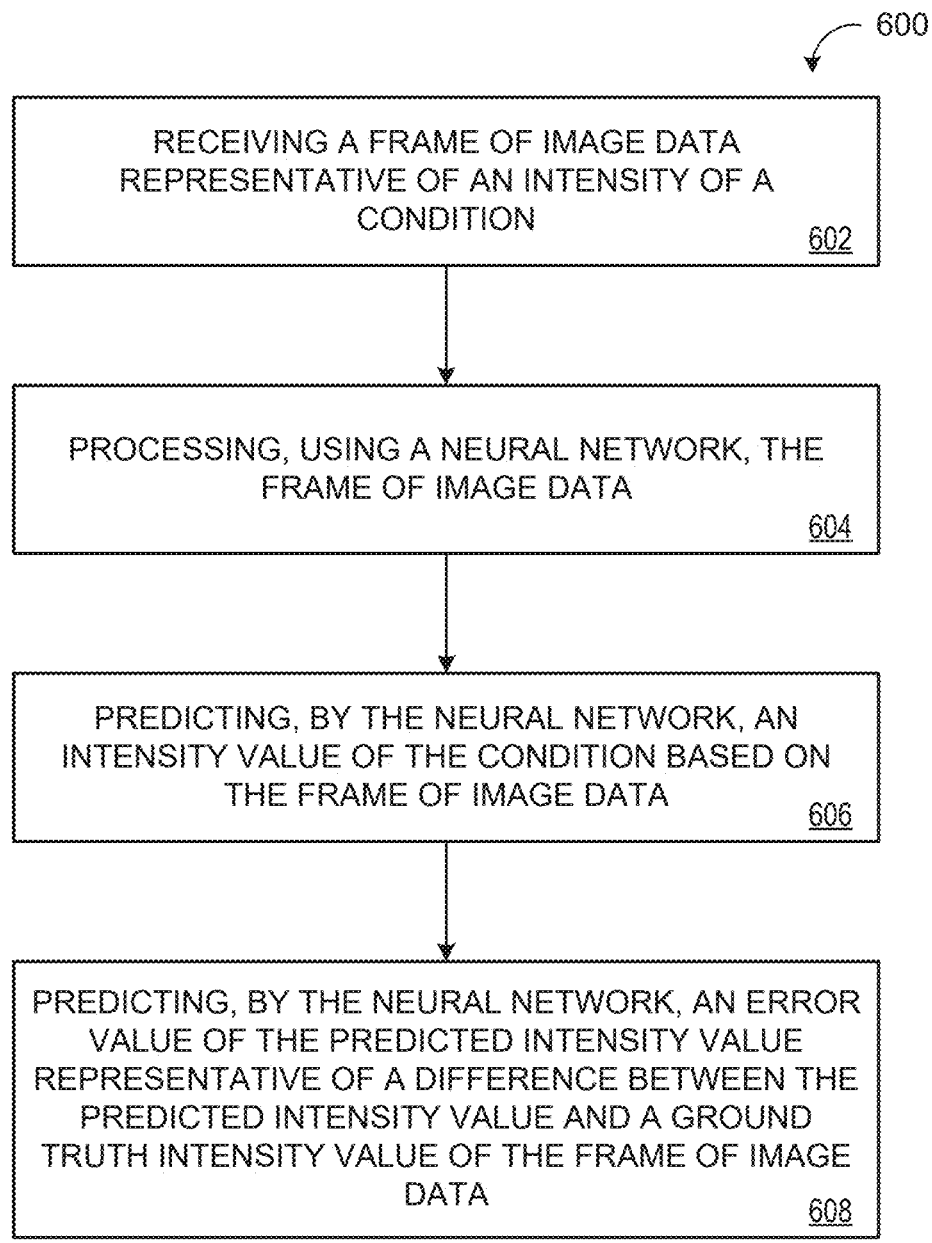
FIG. 6 is a flowchart of an example arrangement of operations for a method of image scoring user error prediction.

FIG. 6 is a flowchart of an exemplary arrangement of operations for a method 600 of image scoring using error prediction. The method 600 includes, at step 602, receiving, at data processing hardware 12, a frame of image data 20 representative of an intensity of a condition. The method 600, at step 604, includes processing, by the data processing hardware 12, using a neural network 110, the frame of image data 20. At step 606, the method 600 includes predicting, by the neural network 110, an intensity value 120 of the condition based on the frame of image data 20. At step 608, the method 600 includes predicting, by the neural network 110, an error value 130 of the predicted intensity value 120. The error value 130 is representative of a difference between the predicted intensity value 120 and a ground truth intensity value 122 of the frame of image data.

Figure 7:
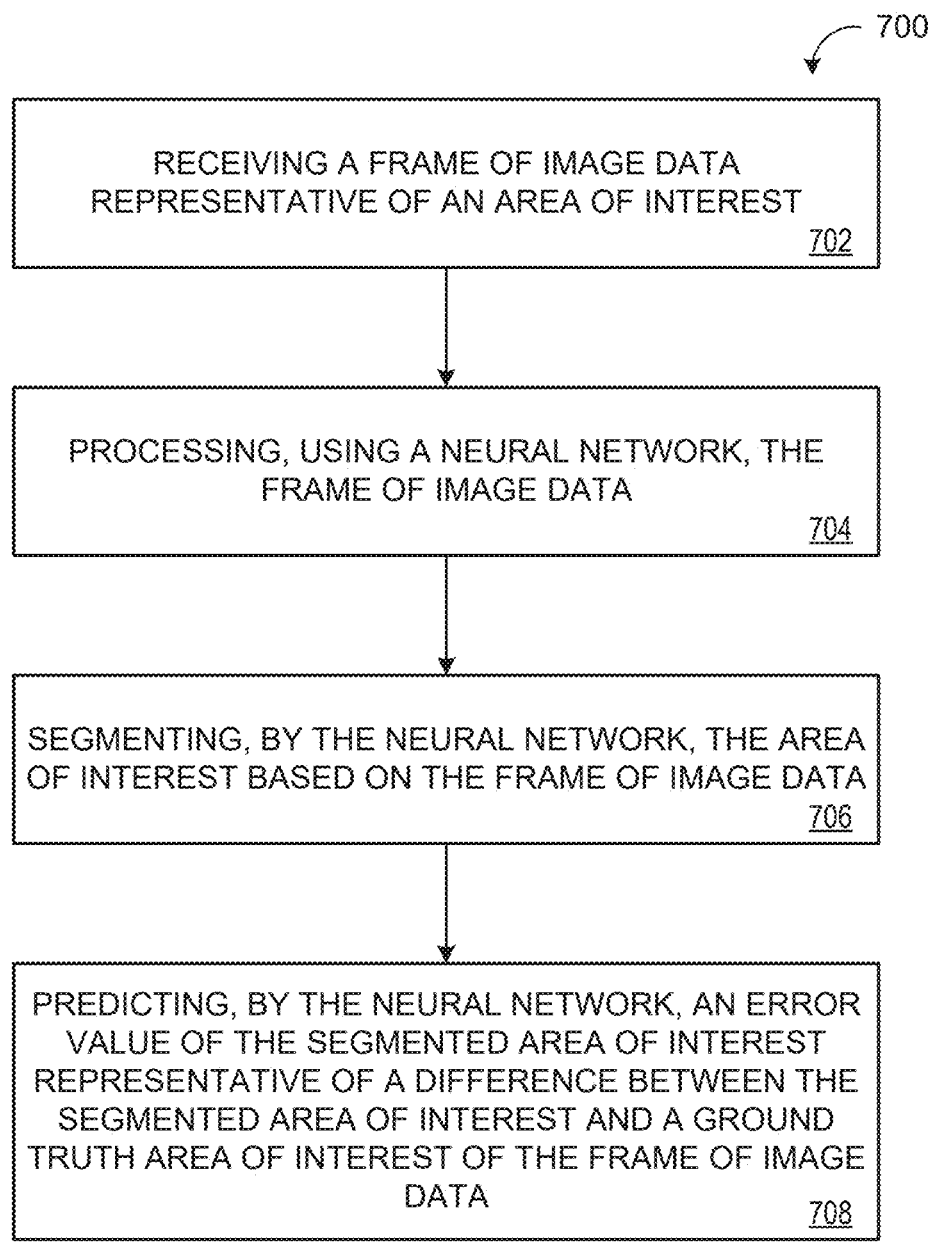
FIG. 7 is a flowchart of another example arrangement of operations for a method of image scoring using error prediction.

FIG. 7 is a flowchart of another exemplary arrangement of operations for a method 700 of image scoring using error prediction. The method 700 includes, at step 702, receiving, at data processing hardware 12, a frame of image data 20 representative of an area of interest. The method 700, at step 704, includes processing, by the data processing hardware 12, using a neural network 110, the frame of image data 20. At step 706, the method 700 includes segmenting, by the neural network 110, the area of interest based on the frame of image data 20. At step 708, the method 700 includes predicting, by the neural network 110, an error value 130 of the segmented area of interest. The error value 130 is representative of a difference between the segmented area of interest and a ground truth area of interest of the frame of image data.

Figure 8:
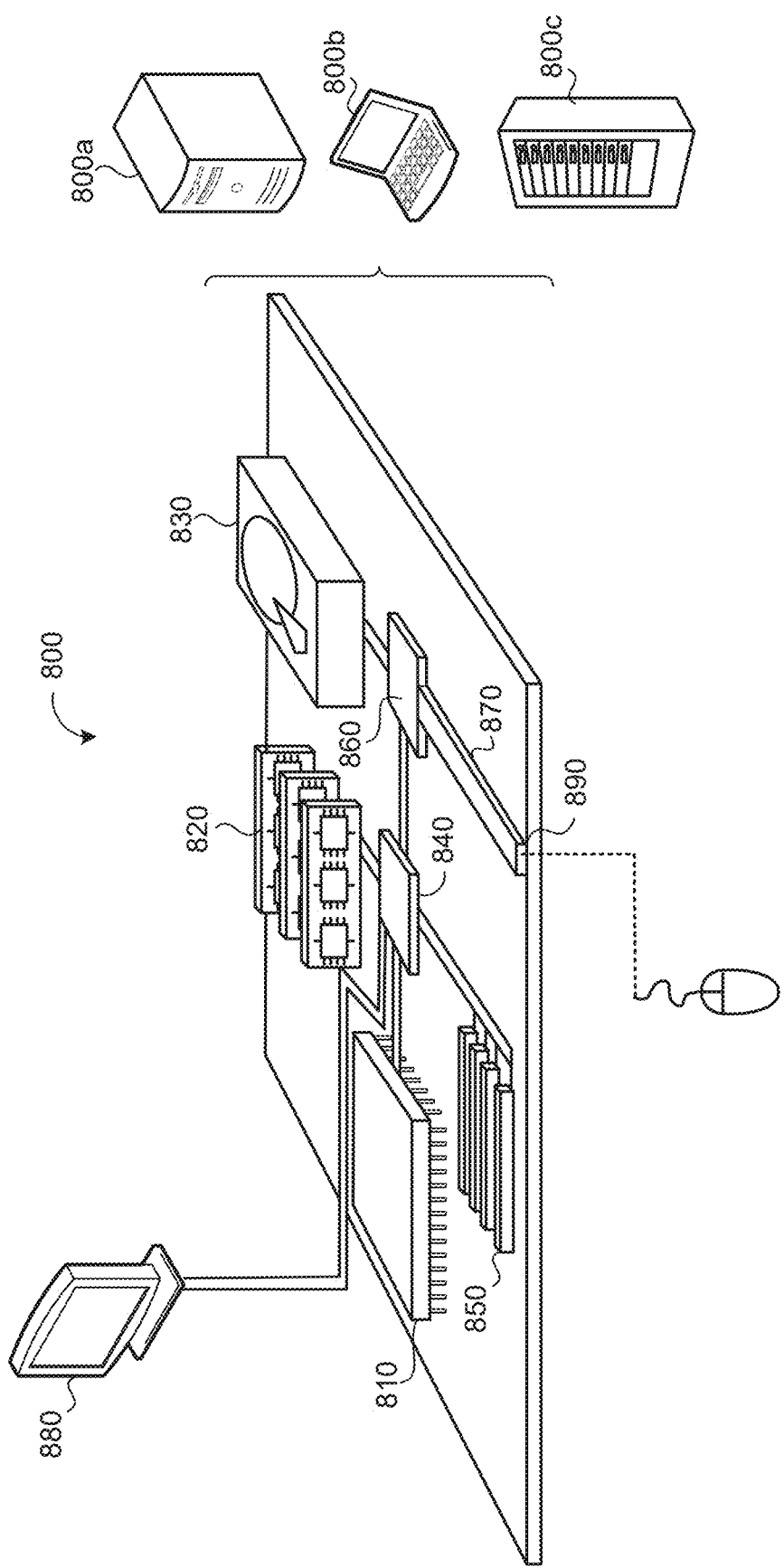
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

The invention claimed is:

1. A method comprising:
receiving, at data processing hardware, a series of frames of image data, each frame of image data of the series of frames of image data representative of an intensity of a condition;
for each respective frame of image data of the series of frames of image data:
predicting, by a neural network during an inference operation and as a first direct output of the neural network, an intensity value of the condition based on the frame of image data;
predicting, by the neural network during the inference operation and as a second direct output of the neural network, an error value of the predicted intensity value, the predicted error value representative of a difference between the predicted intensity value and a ground truth intensity value of the respective frame of image data; and
determining, by the data processing hardware, a frame informativeness based on the predicted error value, the frame informativeness representative of a difficulty of determining the intensity value of the respective frame;
selecting, by the data processing hardware, a subset of frames from the series of frames of image data based on the frame informativeness of each respective frame; and
providing, by the data processing hardware, the selected subset of frames for manual evaluation.

2. The method of claim 1, further comprising:
determining, by the data processing hardware, the intensity of the condition based on the predicted intensity values and the predicted error values of each frame of the series of frames of image data.

3. The method of claim 2, wherein determining the intensity of the condition based on the predicted intensity values and the predicted error values of each frame of the series of frames of image data comprises fitting a curve to at least a portion of the predicted intensity values.

4. The method of claim 1, wherein selecting the subset of frames comprises selecting the frames of image data with the highest frame informativeness.

5. The method of claim 1, wherein the neural network comprises a regression convolutional neural network (CNN).

6. The method of claim 1, wherein predicting the intensity value of the condition based on the frame of image data comprises:
predicting an orientation intensity value of the condition for each of a plurality of different orientations of the frame of image data; and
determining the intensity value of the condition based on each of the orientation intensity values.

7. The method of claim 6, wherein determining the intensity value of the condition based on each of the orientation intensity values comprises determining an inverse variance weighted mean of the orientation intensity values.

8. The method of claim 6, wherein the plurality of different orientations comprises eight different orientations.

9. The method of claim 1, wherein the neural network is initially trained using a first loss function representative of the difference between the predicted intensity value and the ground truth intensity value of the frame of image data.

10. The method of claim 9, wherein the neural network, after being initially trained using the first loss function, is subsequently trained with a second loss function representative of:

the difference between the predicted intensity value and the ground truth intensity value of the frame of image data; and a difference between the predicted error value and a ground truth error value of the frame of image data.

11. The method of claim 1, wherein the condition comprises a disease.

12. The method of claim 1, wherein the frame of image data is representative of an inside surface of a digestive organ of a patient.

13. The method of claim 12, wherein the digestive organ comprises an esophagus, a stomach, a small intestine or a large intestine.

14. The method of claim 1, wherein the frame of image data comprises a frame of medical image data.

15. A method comprising:

receiving, at data processing hardware, a series of frames of image data, each frame of image data of the series of frames of image data representative of an area of interest;

for each respective frame of image data of the series of frames of image data:

segmenting, by a neural network, the area of interest based on the frame of image data;

predicting, by the neural network during an inference operation and as a direct output of the neural network, an error value of the segmented area of interest, the predicted error value representative of a difference between the segmented area of interest and a ground truth area of interest of the respective frame of image data;

determining, by the data processing hardware, a frame informativeness based on the predicted error value, the frame informativeness representative of a difficulty of determining an intensity value of the area of interest; and selecting, by the data processing hardware, a subset of frames from the series of frames of image data based on the frame informativeness of each respective frame; and providing, by the data processing hardware, the selected subset of frames for manual evaluation.

16. A system comprising:

data processing hardware; and memory hardware in communication with the data processing hardware, the memory hardware storing instructions that when executed on the data processing hardware cause the data processing hardware to perform operations comprising:

receiving a series of frames of image data, each frame of image data of the series of frames of image data representative of an intensity of a condition;

for each respective frame of image data of the series of frames of image data:

predicting, by a neural network during an inference operation and as a first direct output of the neural network, an intensity value of the condition based on the frame of image data;

predicting, by the neural network during the inference operation and as a second direct output of the neural network, an error value of the predicted intensity value, the predicted error value representative of a difference between the predicted intensity value and a ground truth intensity value of the respective frame of image data;

determining a frame informativeness based on the predicted error value, the frame informativeness representative of a difficulty of determining the intensity value of the respective frame; and selecting a subset of frames from the series of frames of image data based on the frame informativeness of each respective frame; and providing the selected subset of frames for manual evaluation.

17. The system of claim 16, wherein the operations further comprise determining the intensity of the condition based on the predicted intensity values and the predicted error values of each frame of the series of frames of image data.

18. The system of claim 17, wherein determining the intensity of the condition based on the predicted intensity values and the predicted error values of each frame of the series of frames of image data comprises fitting a curve to at least a portion of the predicted intensity values.

19. The system of claim 17, wherein selecting the subset of frames comprises selecting the frames of image data with the highest frame informativeness.

20. The system of claim 16, wherein the neural network comprises a regression convolutional neural network (CNN).

21. The system of claim 16, wherein predicting the intensity value of the condition based on the frame of image data comprises:

predicting an orientation intensity value of the condition for each of a plurality of different orientations of the frame of image data; and determining the intensity value of the condition based on each of the orientation intensity values.

22. The system of claim 21, wherein determining the intensity value of the condition based on each of the orientation intensity values comprises determining an inverse variance weighted mean of the orientation intensity values.

23. The system of claim 21, wherein the plurality of different orientations comprises eight different orientations.

24. The system of claim 16, wherein the neural network is initially trained using a first loss function representative of the difference between the predicted intensity value and the ground truth intensity value of the frame of image data.

25. The system of claim 24, wherein the neural network, after being initially trained using the first loss function, is subsequently trained with a second loss function representative of:

the difference between the predicted intensity value and the ground truth intensity value of the frame of image data; and a difference between the predicted error value and a ground truth error value of the frame of image data.

26. The system of claim 16, wherein the condition comprises a disease.

27. The system of claim 16, wherein the frame of image data is representative of an inside surface of a digestive organ of a patient.

28. The system of claim 27, wherein the digestive organ comprises an esophagus, a stomach, a small intestine or a large intestine.

29. The system of claim 16, wherein the frame of image data comprises a frame of medical image data.

30. A system comprising:

data processing hardware; and memory hardware in communication with the data processing hardware, the memory hardware storing instructions that when executed on the data processing hardware cause the data processing hardware to perform operations comprising:

receiving a series of frames of image data, each frame of image data of the series of frames of image data representative of an area of interest;

for each respective frame of image data of the series of frames of image data:

segmenting, by a neural network, the area of interest based on the frame of image data;

predicting, by the neural network during an inference operation and as a direct output of the neural network, an error value of the segmented area of interest, the predicted error value representative of a difference between the segmented area of interest and a ground truth area of interest of the respective frame of image data; and determining, by the data processing hardware, a frame informativeness based on the predicted error value, the frame informativeness representative of a difficulty of determining an intensity value of the area of interest;

selecting, by the data processing hardware, a subset of frames from the series of frames of image data based on the frame informativeness of each respective frame; and providing, by the data processing hardware, the selected subset of frames for manual evaluation.

\* \* \* \* \*